F. J. CRISSEY.
Churn.

No. 55,825.

Patented June 26, 1866.

INVENTOR.

UNITED STATES PATENT OFFICE.

F. J. CRISSEY, OF LEESBURG, VIRGINIA.

IMPROVEMENT IN CHURNS.

Specification forming part of Letters Patent No. 55,825, dated June 26, 1866.

*To all whom it may concern:*

Be it known that I, F. J. CRISSEY, of Leesburg, county of Loudoun, and State of Virginia, have invented new and useful Improvements in Churns; and I do hereby declare the following to be an exact description thereof, reference being had to the accompanying drawings, and to the letters of reference marked thereon, making a part of this specification, in which—

Figure 1:
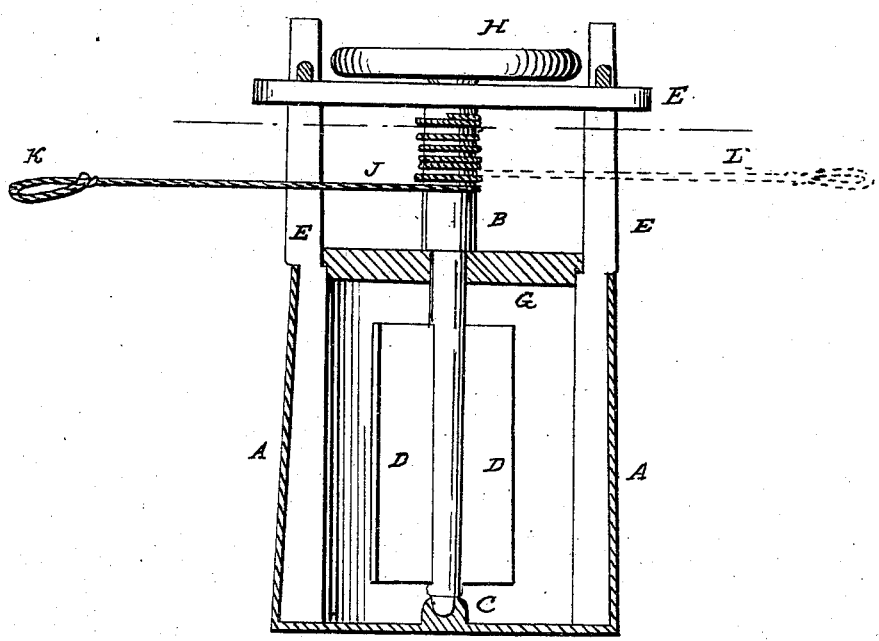
Figure 2:
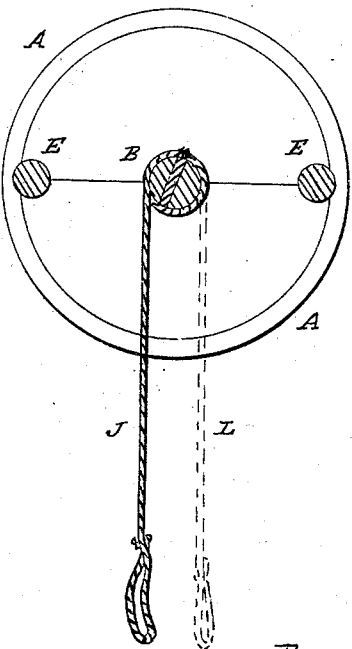

Figure 1 is a vertical section; Fig. 2, a top view.

The nature of my invention consists in the arrangement of a vertical center dasher on each side of a vertical shaft, with a horizontal fly-wheel on top and a propelling-cord on the shaft, so that the shaft can be operated with velocity and a forward and reverse action.

A represents the upright churn, made of metal or wood and cylindrically shaped. In the center of the churn is a vertical shaft, B, that revolves in a step, c, at the bottom. A vertical narrow dasher, D, the length of the churn, made of metal or wood, is permanently set through a slot in the shaft, so as to form two wings or dashers, D D. Above the churn are two posts and a cross-piece, E E E, to brace and support the vertical position of the shaft.

G is the lid of the churn; H, the horizontal fly-wheel at the top of the shaft, and J the propelling-cord, one end fastened permanently to the shaft and wound a few times around the shaft, and the end K the handle by which the cord is drawn forward by the operator and again backward by the reverse motion, which gives a forward and reverse action to the shaft, driving the shaft and dasher with great velocity, and throwing the cream from the center with a violent reactionary force, the fly-wheel regulating and assisting the rapid winding of the cord both ways, as shown by the red cord marked L.

The dasher D operates very easily on account of its wings not projecting near to the sides of the churn, but being narrow throws the cream outwardly, dashing the cream both ways with a swift back action, and collecting the butter quickly.

In a four-gallon churn in which two and a half gallons of cream were put butter has been made in less than two minutes of time; but with the advantages herein set forth there is another of much utility, not practicable with other churns, viz: I can also manufacture miniature churns after my invention, thus constructing these churns in size to hold one quart of cream, and just before meal-time I put my miniature churn in operation, and in two minutes produce three-quarters of a pound of butter, fresh for each meal, with the utmost facility, ease, and dispatch, making the churn the most economical and useful for a small family.

What I claim as my invention, and desire to secure by Letters Patent, is—

The arrangement and combination of the center dasher with fly-wheel at top and propelling-cord on the shaft, so that the shaft is operated swiftly, with a forward and reverse action, as herein described, and for the purposes set forth.

F. J. CRISSEY.

Witnesses:
J. FRANKLIN REIGART,
GEO. H. MILLS.